United States Patent [19]

Cheah

[11] Patent Number: 5,428,902

[45] Date of Patent: Jul. 4, 1995

[54] INCLINOMETER SENSING CIRCUITRY AND OPERATION

[75] Inventor: Chun-Foong Cheah, Foster City, Calif.

[73] Assignee: Precision Navigation, Inc., Mt. View, Calif.

[21] Appl. No.: 201,613

[22] Filed: Feb. 24, 1994

[51] Int. Cl.⁶ ............................................. G01C 9/06
[52] U.S. Cl. ..................................... 33/366; 324/707
[58] Field of Search ................. 324/707; 33/365, 366, 33/390, 521

[56] References Cited

U.S. PATENT DOCUMENTS

| | | | |
|---|---|---|---|
| 1,007,998 | 11/1911 | Whalton | 33/366 |
| 3,290,786 | 12/1966 | Parkin | 33/366 |
| 4,077,132 | 3/1978 | Erickson | 33/366 |
| 4,531,300 | 7/1985 | Heidel et al. | 33/366 |
| 4,583,296 | 4/1986 | Dell'Acqua | 33/366 |
| 4,628,729 | 12/1986 | Thoone | 33/366 |
| 5,083,383 | 1/1992 | Heger | 33/366 |
| 5,259,118 | 11/1993 | Heger | 33/365 |

FOREIGN PATENT DOCUMENTS

| | | | |
|---|---|---|---|
| 665628 | 1/1952 | United Kingdom | 33/366 |
| 2112524 | 7/1983 | United Kingdom | 33/366 |

*Primary Examiner*—William A. Cuchlinski, Jr.
*Assistant Examiner*—G. Bradley Bennett
*Attorney, Agent, or Firm*—Donald R. Boys

[57] ABSTRACT

Measurement circuitry for a biaxial inclinometer having electrolytic fluid incorporates a Schmitt trigger for measuring the resistance of each leg of the inclinometer by measuring the frequency output of the Schmitt trigger circuit while each leg is placed across input and output terminals. Switching is accomplished by cycling analog multiplexers as solid-state switches under control of a microprocessor. To minimize net dc current across any leg, legs are periodically reversed in polarity as they are switched into the Schmitt trigger circuit for measurement. Additionally, in the wiring of the switching multiplexers to the inclinometer legs, an additional analog multiplexer is switched to place a low clamp resistance in parallel with each leg not being measured in a cycle, to compensate for leakage current.

16 Claims, 5 Drawing Sheets

INCLINOMETER SENSING CIRCUITRY AND OPERATION

FIELD OF THE INVENTION

This invention is in the area of methods and apparatus for sensing and reporting inclination of objects and instruments, particularly with respect to the Earth's magnetic field.

BACKGROUND OF THE INVENTION

There are many uses for a device that can sense orientation relative to the Earth's gravity vector. Such information is useful, for example for navigation equipment and for stabilizing apparatus, and the like. Another important use is in instruments and devices that sense the Earth's magnetic field, and use that information for such as navigational purposes.

Inclination is important for instruments that sense the Earth's magnetic field, because the orientation of a sensing device, typically called a magnetometer, greatly effects reading and determination of the field magnitude and direction.

There are a number of devices known for measuring inclination, taking advantage of the Earth's gravity vector as an absolute standard. One such device is known in the art as a dual axis inclinometer. There are two basic types of such inclinometers. One is a capacitance type that uses a fluid in an annular container having electrodes positioned on opposite walls of the annulus. Typically one wall of the annulus serves as a common electrode, and the opposite wall has four separate electrodes arranged at ninety-degree intervals, so there are two electrode pairs on horizontal axes at right angles to one another and to the axis of the annulus as well.

A second sort has typically a sealed cylinder partially filled with electrolytic fluid, and five electrodes that penetrate the floor of the cylinder. Four of the electrodes are arranged in a pattern at the corners of a square, with the fifth at the center of the square. This is a resistance inclinometer, as opposed to a capacitance type inclinometer. In the present invention, the electrolytic resistance type inclinometer is of particular interest.

As described above, in a liquid-filled electrode-type inclinometer, it is the relative level of fluid between electrodes that determines the measurable electrical resistance between electrodes. The arrangement of the five electrodes allows electrical measurements between any two to be used to determine the tilt of the container into which the electrodes protrude.

There are serious difficulties associated with both the capacitance measurement and the resistance measurement approaches to determining inclination. For example, in the capacitance measurement approach, the fluid itself has a high dielectric strength, and a pair of electrodes empty of fluid still shows high capacitance. The result is that the difference in capacitance for a pair of electrodes filled with fluid to the maximum level, and practically devoid of fluid at the other extreme, is quite small, so the resolution of such an instrument is severely limited, and relative errors may be quite high. Circuitry to discriminate in such a tight resolution band is also generally more expensive to build and operate.

There is no equivalent resolution problem in the resistance approach. In this approach, the fluid is electrolytic, such as a salt solution, and is relatively electrically conductive compared to the dielectric approach. Circuitry connected to the electrodes in a resistance-type inclinometer is implemented, as stated above, to measure resistance between electrodes, and to use the resistance measurements to determine tilt of the electrode container.

For the resistance inclinometers the resistance between electrodes varies over a very broad range of resistance, essentially between a relatively low resistance and infinite resistance. This is enough to provide fine resolution. The electrolytic fluid, however, is very sensitive and fragile. Due to the presence of electrodes and the ionic nature of the fluid, a net electrical current in one direction will change the composition of the fluid drastically. In a typical case a net dc component across an electrode of 1 $\mu$Amp for 10 seconds will render the fluid useless, effectively destroying the inclinometer element of the instrument.

To counter the extreme electrical delicacy of electrolytic inclinometers to net dc current, manufacturers lave developed circuitry to test the resistance between electrodes with an alternating current having as nearly as possible a 50% duty cycle. That is, the current flows in one direction as nearly as possible with the same average amplitude and time as in the opposite direction.

One way manufacturers have attempted to solve the problem is by providing square waves for testing using very accurate generating circuitry. To do this, however, requires careful selection of components, such as resistors, capacitors, inductors, and the like for the square wave generator. As there is a practical limit to the repeatability of characteristics between manufactured components, for example, the components may often have to be selected and tested by hand to provide matching values to build such accurate devices.

What is clearly needed is a circuit for utilizing a resistance-type inclinometer device in a manner that avoids net dc current between electrodes, and therefore avoids deteriorating electrolytic fluid, without requiring expensive, hand-selected and tested components, and does so with circuitry of low complexity and cost relative to conventional solutions.

SUMMARY OF THE INVENTION

A circuit is provided for measuring resistance in legs of an inclinometer containing electrolytic fluid, comprising a Schmitt trigger circuit for generating a signal with a frequency proportional to an electrical resistance placed across an input and an output lead of the Schmitt trigger circuit, and solid state switching circuitry connected to the legs of the inclinometer and controllable to connect each of the legs of the inclinometer individually across the Schmitt trigger input and output leads. The form of the alternating current through the legs of the inclinometer while measurement is accomplished exhibits a near fifty-percent duty cycle. This circuit provides a simpler measuring circuit, and a measurement output that is relatively easily handled by a microprocessor to determine resistance, and therefore orientation of an inclinometer.

In a preferred embodiment, switching of the legs of the inclinometer across input and output terminals of the Schmitt trigger is done by cycling analog multiplexers connected to the legs of the inclinometer. Also in a preferred embodiment, the polarity of the legs of the inclinometer is reversed periodically to minimize net dc current flow through the legs of the inclinometer over the time of repeated measurements. Net dc current is known to be damaging to the electrolytic fluid used in such inclinometers.

In a further embodiment of the invention an additional analog multiplexer is utilized to place low resistance clamp resistors in parallel with inclinometer legs not being measured, to minimize leakage current through the legs not connected to the Schmitt trigger circuit. Leakage current then flows through the clamp resistors rather than the inclinometer legs.

The circuitry of the invention provides an accurate and convenient method for measuring the resistance of legs of an inclinometer in a fashion relatively easily handled by a microprocessor to determine the orientation of the inclinometer for any purpose. The use of polarity reversal also provides an added level of security in longevity of the electrolytic fluid used in such inclinometers.

DESCRIPTION OF THE PREFERRED EMBODIMENTS

In embodiments of the present invention using inclinometers with electrolytic fluid, rather than generating and supplying a square wave with a carefully managed duty cycle to avoid a net dc current, the inclinometer element is made the variable resistance element in a Schmitt trigger circuit, and the resistance value is interpreted according to the output frequency of the Schmitt trigger circuit. To further ensure net dc current as close to zero as possible, as elements are multiplexed for testing, the polarity of electrode pairs is reversed on a managed time basis.

Figure 1:
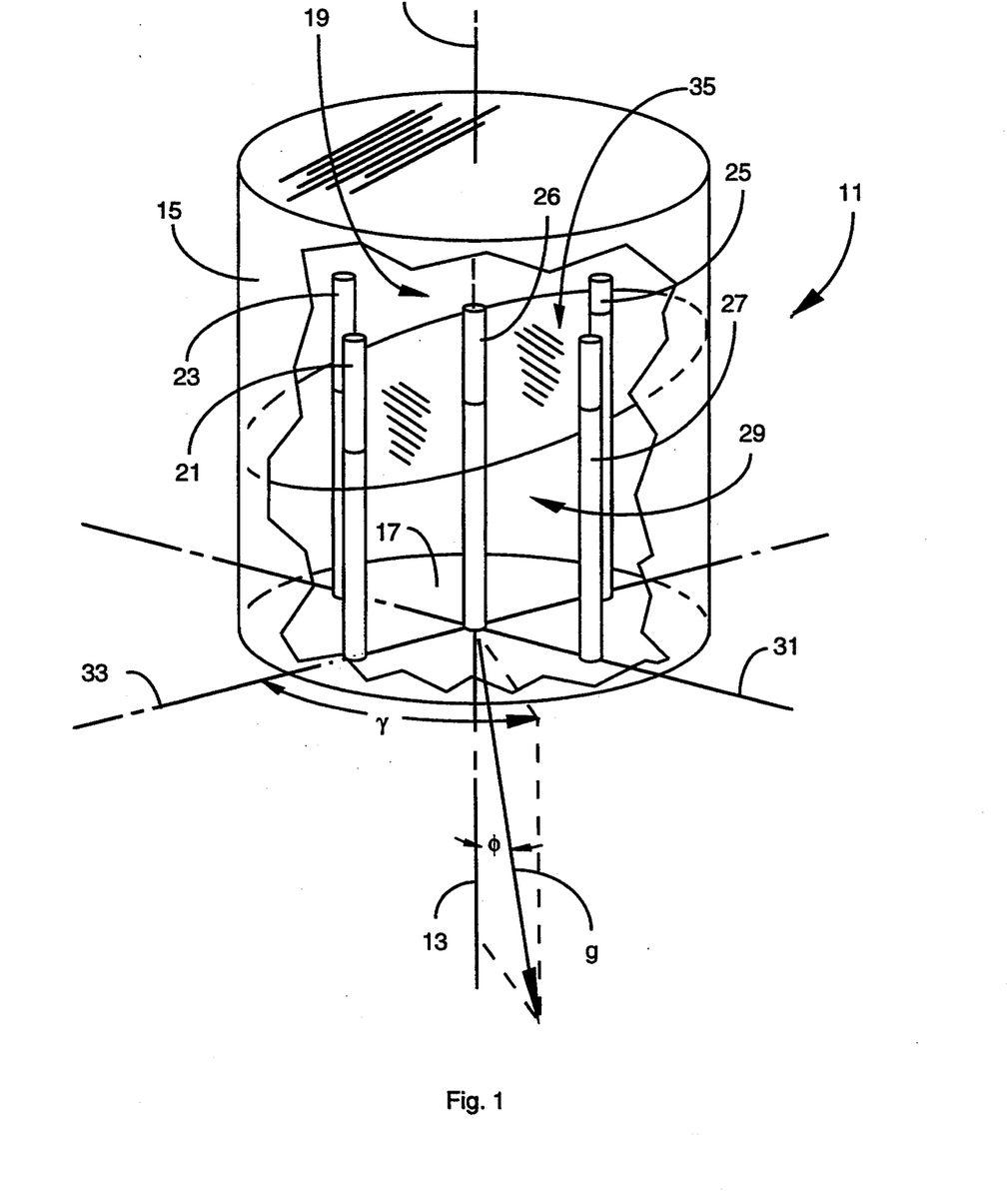
FIG. 1 is a partially cut-away isometric view of a biaxial electrolytic inclinometer as used in the present invention.

FIG. 1 is a partially cut-away isometric view of a biaxial electrolytic inclinometer 11. Inclinometer 11 is constructed to have an outer can 15 and a bottom surface 17 defining a generally cylindrical enclosure having a central axis 13. The enclosure defines an internal volume 19.

There are five conductive pins (electrodes) 21, 23, 25, and 27 arranged, as described above in the background section, in a square pattern, and a fifth common pin electrode 26 at the center of the square pattern. The distance between common electrode 26 and each of the other electrodes is the same. An electrolytic fluid 29 partially fills volume 19.

In FIG. 1 the inclinometer is shown tilted relative to vector g, which represents the gravitational vector of the mass of the Earth. If device 11 is oriented with axis 13 collinear with the Earth's gravitational vector (not the case in FIG. 1) the inclinometer is level with the surface of the Earth. In this case, the fluid establishes an equal level (depth) relative to each electrode. As the inclinometer tilts, the amount of electrolytic fluid between electrodes changes, changing the resistance between electrodes. Resistance measurements are made between each of the outer electrodes and the central electrode to determine tilt. For descriptive purposes hereinafter, each electrode pair comprising one outer electrode and the center common electrode will be referred to by the element number given the outer electrode (21, 23, 25, and 27).

In FIG. 1 two horizontal axes 31 and 33 are shown perpendicular to one another, and perpendicular as well to vector g. Axis 31 passes through the centerlines of opposite legs 23 and 27, and axis 33 passes through the centerlines of opposite legs 21 and 25. Tilt may be thought of as relative rotation about each of these horizontal axes, with the level position defined as zero rotation.

If inclinometer 11 is, in fact, level with the surface of the Earth, then the resistance in all four legs will be the same, because the level of fluid in each of the four legs will be the same.

As device 11 is tilted, as is the case in FIG. 1, fluid level rises for one of a pair of opposite legs, and falls for the opposite leg, unless the tilt is entirely around horizontal axis 31 or 33. The degree of tilt is shown by surface 35 of the electrolytic fluid, which remains level with the surface of the Earth when the inclinometer is tilted.

Tilt must necessarily have a component relative to each of axes 33 and 31 (it may be zero in one but not both), and the relative resistances of opposite legs may be used to determine the tilt component relative to each of axis 33 and 31, and therefore the overall tilt and rotational relationship to axes 33 and 31.

In FIG. 1, the overall tilt, defined as the angle the inclinometer axis makes with g, is indicated by angle $\Phi$, lying in the plane defined by axis 13 and g rotated by angle $\gamma$. The tilt angle is calculated by an algorithm using the resistances in the four legs to determine the relative tilt around axes 31 and 33. Such algorithms are well-known in the art, and are not reproduced here.

Figure 2:
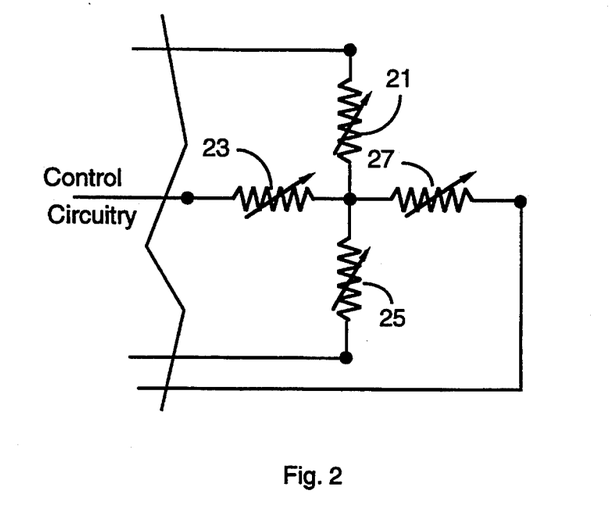
FIG. 2 is a representation of the four legs of a biaxial inclinometer as resistors connected to a common terminal.

FIG. 2 is a plan view schematic of the four legs, 21, 23, 25, and 27 of inclinometer 11, with the four legs indicated as variable resistors having a common side, which is the center electrode 26 of the array of four resistors. The legs are shown connected to control circuitry, which is described in more detail below. In the present invention, as in conventional implementations of biaxial inclinometers using electrolytic fluid, measurement of the value of the resistances due to tilt of the inclinometer is used to determine tilt.

In use, an instrument employing an inclinometer of the type illustrated in FIG. 1 may change orientation rather rapidly. It is also necessary to measure resistance for all four legs to determine tilt. For these reasons it is necessary to multiplex measurements rather rapidly. Typically measurement circuitry is operated by a microprocessor, which also interprets the measurement results and calculates tilt by means of programmed control routines.

Figure 3:
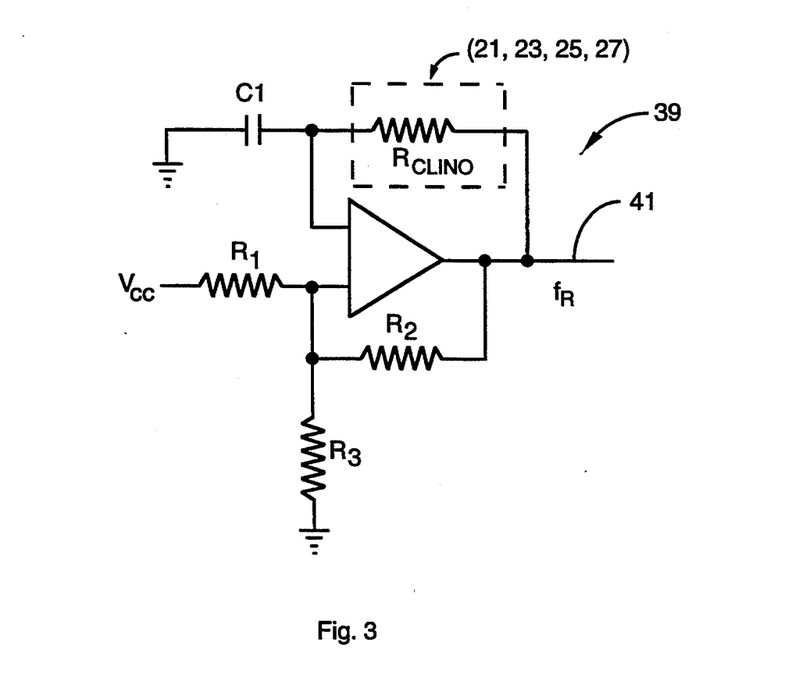
FIG. 3 is a schematic of a Schmitt trigger circuit as used in the invention for measuring resistance in legs of an inclinometer.

FIG. 3 is a schematic of a single variable resistance labeled $R_{CLINO}$ in a Schmitt trigger circuit 39. $R_{CLINO}$ represents the resistance of any leg 21, 23, 25, and 27 of inclinometer 11. FIG. 3 does not reveal any means for multiplexing testing of the legs of the inclinometer, but is intended, rather, to illustrate the method incorporated in the present invention for measuring resistance in one leg.

In the present invention one Schmitt trigger circuit 39 is used, and the four legs of the biaxial inclinometer are switched, one at a time and in repeating sequence, into the Schmitt trigger circuit. The output of the Schmitt trigger in line 41, as is well-known in the art, is a near square voltage wave with frequency $f_R$ dependent on the values of the input resistors, including $R_{CLINO}$, and capacitor $C_1$. Counter circuitry not shown in FIG. 3 is connected to line 41 to determine the frequency, which is used by algorithms to determine the tilt. The dotted line around $R_{CLINO}$ is used to indicate that legs 21, 23, 25, and 27 are switched into the circuit in repeating sequence.

Figure 4:
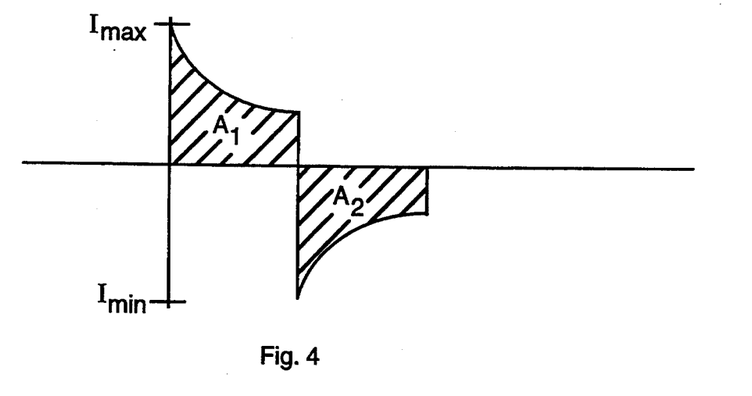
FIG. 4 is a representation of the alternating current expected through a leg of an inclinometer connected across the input and output of a Schmitt trigger circuit.

In respect to the requirement for near zero net dc current across the legs of the inclinometer, FIG. 4 indicates a full cycle of current with respect to time through $R_{CLINO}$. The areas $A_1$ and $A_2$ indicate the product of current and time, and for there to be no net dc current over time through $R_{CLINO}$ these areas must be equal. It can be shown mathematically that the duty cycle for the Schmitt trigger circuit is very sensitive to the accuracy of $R_1$, $R_2$, and $R_3$. As a practical matter, resistors may be purchased matched to about 1%. At this level of repeatability, calculations indicate the possible net dc current in $R_{CLINO}$ to be still high enough to present a possible problem.

Applying the legs of the inclinometer across a Schmitt trigger one-at-a-time simplifies control circuitry for an instrument using the inclinometer, and the changing frequency output of the Schmitt trigger is easily handled by a microprocessor. In addition, calculations and tests show that this arrangement is as good as the square wave approach for ensuring minimum net dc current through legs of the inclinometer. So in this embodiment the invention has utility and application. It is preferred, however, to provide a margin of safety for the net dc requirement, as any error or mismatched components in either case may still result in destruction of the inclinometer.

To ensure a margin of safety relative to net dc current for the electrolytic fluid in legs of the inclinometer, control circuitry is provided in an alternative preferred embodiment to periodically reverse polarity for the legs of the inclinometer as they are multiplexed into the Schmitt trigger circuit.

Figure 5:
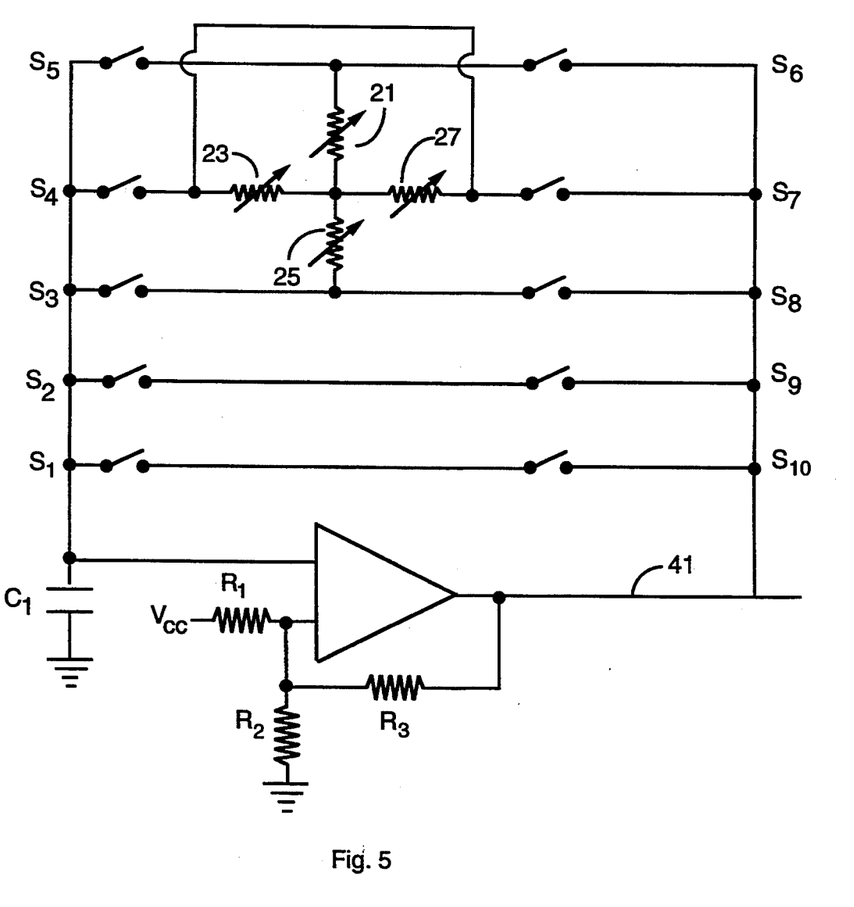
FIG. 5 is a schematic showing the four legs of a biaxial inclinometer connected through remotely controllable switches across the input and output terminals of a Schmitt trigger circuit.

FIG. 5 is a schematic representation of a switching circuit for switching legs 21, 23, 25, and 27 into Schmitt trigger 39, including capability of periodically reversing polarity for the legs of the inclinometer, by means of switches $S_1$ through $S_{10}$. By closing switches $S_2$ and $S_{10}$, for example, with all other switches open, leg 23 is active in the trigger circuit. If $S_1$ and $S_9$ are the only switches closed, leg 23 is still the leg in the Schmitt trigger circuit, but the polarity is reversed.

Switches $S_5$ and $S_{10}$ apply leg 21 to the Schmitt trigger in one polarity, and switches $S_1$ and $S_6$ reverse the polarity for leg 21 in the circuit. Similarly switch $S_4$ with switch $S_{10}$ applies leg 27 one way, and switch $S_1$ with switch $S_7$ reverses the polarity for leg 27. Finally, switch $S_3$ with switch $S_{10}$ applies leg 25, and switch $S_1$ with switch $S_8$ reverses the polarity for leg 25.

As a practical matter, toggle switches are not available as conventional components in solid-state circuits, and actual mechanical switches may, in any case, not be cycled at the rates necessary for the present purpose. Analog multiplexers may be used to accomplish the necessary switching, however.

Figure 6:
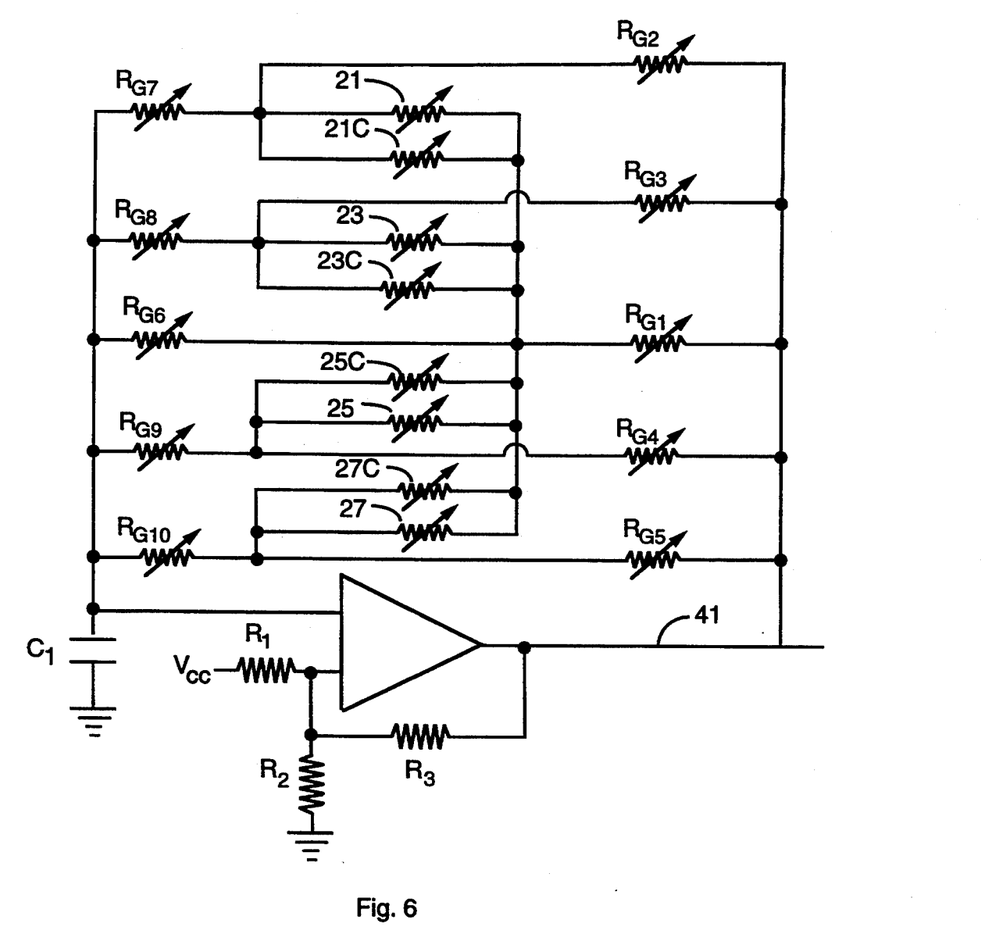
FIG. 6 is a representation of the four legs of a biaxial inclinometer connected in a circuit with switchable resistors of an analog multiplexer, along with clamp resistors.

FIG. 6 is a circuit essentially equivalent to the circuit of FIG. 5 for switching legs of the inclinometer into the Schmitt trigger circuit, including periodic polarity reversal, incorporating an analog multiplexer (MUX). The multiplexer accomplishes switching by imposing a low resistance in place of a relatively high resistance, instead of actually opening a circuit path, as is done with a toggle switch. For an analog MUX the resistance changes from a value of about 200Ω to about 10 MΩ.

In the circuit of FIG. 6 the switching resistors are labeled $R_{Gx}$, where x is 1-10, the numbers corresponding to the switches in FIG. 5. In the schematic of FIG. 6, leg 21 may be placed across the Schmitt trigger by turning "on" $R_{G7}$ and $R_{G1}$ while all other resistors are held "off". In this case "on" means low resistance, and "off" means high resistance. Leg 21 may be placed across the Schmitt trigger in the opposite polarity by turning on resistors $R_{G6}$ and $R_{G2}$. In a similar manner, the other legs may be placed across the Schmitt trigger in either direction by appropriately switching other resistances off and on. The specific patterns are evident in FIG. 6.

The need to use analog multiplexers is dictated by a requirement for solid-state circuitry, providing miniaturization, speed of operation, and cost. The resistances in the multiplexer, however, are such that the leakage current at the operating voltages (typically 0-5 v) is large enough to be of concern. For this reason clamping resistors labeled 21C, 23C, 25C, and 27C are placed in parallel across the legs of the inclinometer to minimize leakage current through the inclinometer legs. In practice, an analog multiplexer is used for the clamps as well as for switching the inclinometer legs into the Schmitt trigger.

Figure 7:
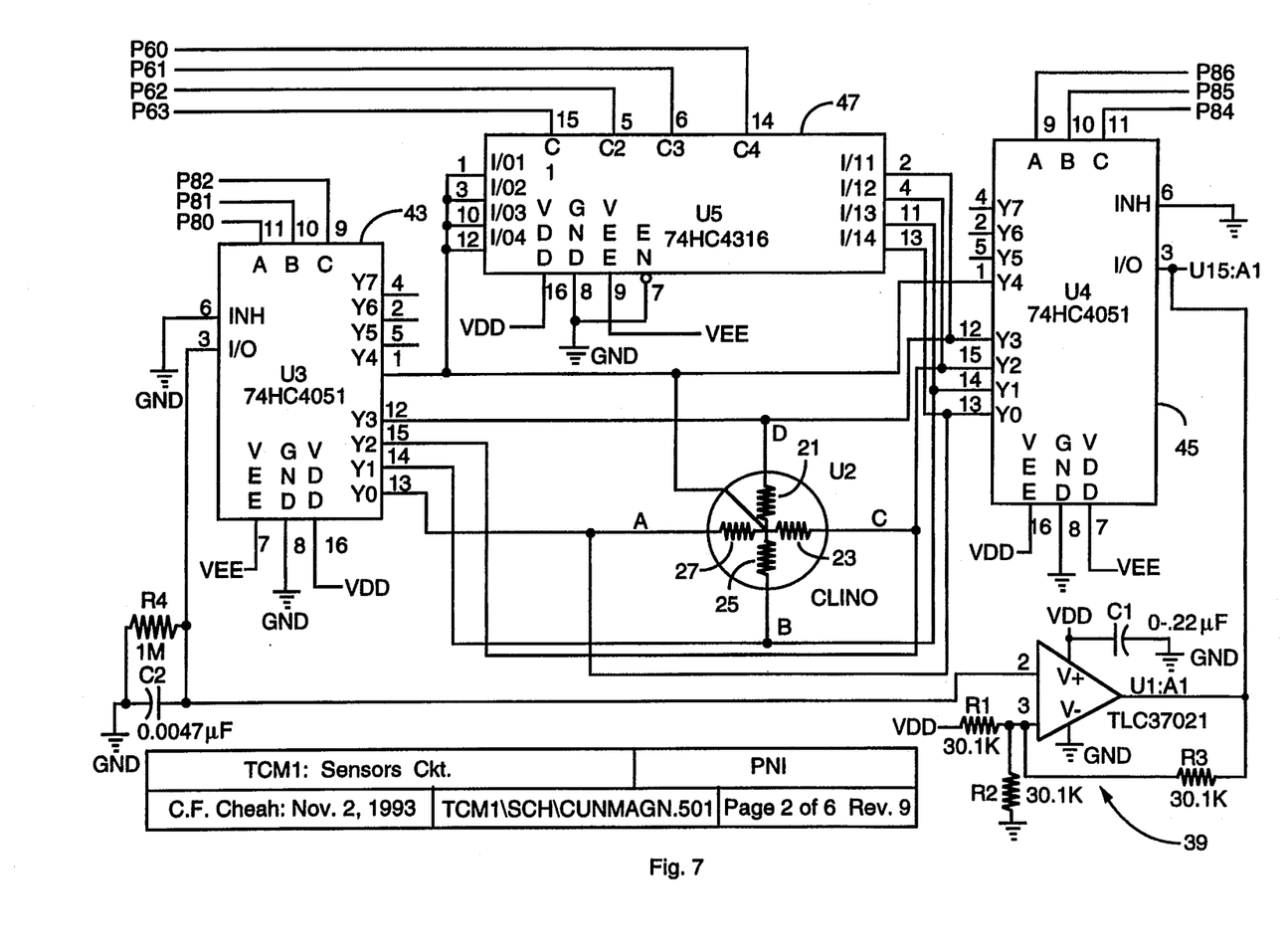
FIG. 7 is an exemplary measurement circuit for a biaxial inclinometer incorporating three analog multiplexers connected to the legs of the inclinometer and the to the Schmitt trigger circuitry.

FIG. 7 is a schematic showing a specific implementation of the circuitry described above for switching legs of inclinometer 11 into Schmitt trigger 39. In this embodiment two analog MUXs 43 and 45 are wired to the legs of inclinometer 11 to provide for switching as described above with reference to FIGS. 5 and 6, and a third MUX 47 provides the clamps as also described above.

In this embodiment legs 21, 23, 25, and 27 are applied across Schmitt trigger 39 between pin 3 of MUX 43 and pin 3 or MUX 45. Both MUX 43 and 45 in this embodiment are U3-74HC4051 devices made by several manufacturers. The clamp MUX is a U5-74HC4316 device.

In operation, MUXs 43, 45, and 47 are controlled by input signals on lines labeled P60-P63 for MUX 47, P80-82 for MUX 43, and P84-P86 for MUX 45, to switch legs 21, 23, 25, and 27 into Schmitt trigger 39 on a sequential and periodic basis, with polarity reversed on a regular basis as well. The switching is accomplished after the fashion described above with reference to FIGS. 5 and 6.

Control is managed by a microprocessor (not shown) and frequency output on the line connected to pin 3 of MUX 45 is input to counter circuitry connected to the microprocessor. The counter circuitry is managed to determine the output frequency for each measurement of an inclinometer leg, which is used in turn by algorithms executable by the microprocessor to determine tilt.

It will be apparent to those with skill in the art that there are many changes that might be made in the embodiments of the invention described herein without departing from the spirit and scope of the invention. For example, there is latitude in the order in which legs are sequenced for measurement as well as in the timing for measurement and for polarity reversal. In one embodiment of the invention one leg is placed across the measurement circuitry for just several milliseconds, and the same leg is measured in the reverse direction (polarity reversed) immediately thereafter, allowing only enough time between measurements to ensure efficient switching. The switching time may vary depending on components, such a MUX devices, used in the circuitry.

As another example, tile specific analog multiplexers selected and used in tile embodiment of FIG. 7 are convenient. There are other solid state devices that could be substituted for those selected. As yet another example, the particular wiring indicated in FIG. 7 is not the only wiring scheme that will accomplish the purpose. The pins of the MUXs may be connected in other than the order shown to multiplex the legs of the inclinometer and to reverse polarity.

Still further, the circuitry according to various embodiments of the invention could be applied to a range of commercially available inclinometers. The inclinometer used in the embodiments described is a Model SP5003 made by Spectron Glass and Electric of Hauppauge, N.Y. Circuitry according to various embodiments of the invention could be developed to operate other models, and tilt sensors with more or fewer than four legs might also be used with appropriate circuitry according to the invention.

As still another example of alterations within the spirit and scope of the invention, there is a broad variation in the hardware and software that might be incorporated to manage the control circuitry described in the various embodiments above. There are similarly many applications for inclinometers and measurement circuitry. In the instant case, the inclinometer and tilt measurement circuitry are employed in a hand-held digital compass, wherein the tilt readings are used to compensate magnetometer readings of the Earth's magnetic field.

What is claimed is:

1. A circuit for measuring resistance in legs of an inclinometer containing electrolytic fluid, comprising:
   a Schmitt trigger circuit for generating a signal with a frequency proportional to an electrical resistance placed across an input and an output lead of the Schmitt trigger circuit; and
   solid state switching circuitry connected to the legs of the inclinometer and controllable to connect each of the legs of the inclinometer individually across the Schmitt trigger input and output leads.

2. A circuit as in claim 1 wherein the switches are controllable to periodically reverse the polarity of the legs of the inclinometer.

3. A circuit as in claim 1 further comprising one solid state switch connected across each leg of the inclinometer and controllable to switch from a high resistance to a low resistance to serve as a clamp resistor in parallel with the leg resistance when the leg is not connected across the leads of the Schmitt trigger circuit.

4. A circuit as in claim 1 wherein the switches and the clamp resistors are provided by solid state analog multiplexer devices.

5. An inclinometer system comprising:
   a biaxial inclinometer having individual legs consisting of pairs of electrodes and containing electrolytic fluid in a manner that fluid level changes in the individual legs according to magnitude of tilt of the inclinometer;
   a Schmitt trigger circuit for generating a signal with a frequency proportional to an electrical resistance placed across an input and an output lead of the Schmitt trigger circuit; and
   solid state switching circuitry connected to the legs of the inclinometer and controllable to connect each of the legs of the inclinometer individually across the Schmitt trigger input and output leads.

6. An inclinometer system as in claim 5 wherein the switches are controllable to periodically reverse the polarity of the legs of the inclinometer.

7. An inclinometer system as in claim 5 further comprising one solid state switch connected across each leg of the inclinometer and controllable to switch from a high resistance to a low resistance to serve as a clamp resistor in parallel with the leg resistance when the leg is not connected across the leads of the Schmitt trigger circuit.

8. An inclinometer system as in claim 5 wherein the switches and the clamp resistors are provided by solid state analog multiplexer devices.

9. A method for measuring resistance in legs of an inclinometer device for determining the orientation of the inclinometer, comprising the steps of:
   (a) connecting a first leg of the inclinometer device across an input and an output terminal of a Schmitt trigger circuit;
   (b) measuring frequency of the signal output by the Schmitt trigger circuit with the first leg connected;
   (c) disconnecting the first leg of the inclinometer from the input and output terminals of the Schmitt trigger circuit and connecting a second leg of the inclinometer to the input and output terminals of the Schmitt trigger circuit;
   (d) measuring frequency of the signal output by the Schmitt trigger circuit with the second leg connected; and
   (e) repeating steps (a) through (d) for other legs of the inclinometer until all legs are measured.

10. The method of claim 9 wherein the steps of connecting legs across the Schmitt trigger circuit are accomplished by controlling solid-state switches.

11. The method of claim 10 wherein the solid-state switches are provided by at least one analog multiplexer integrated circuit.

12. The method of claim 9 further comprising a step (f) for repeating steps (a) through (e), remeasuring all of the legs of the inclinometer in the same order as in steps (a) through (e) to distinguish a new orientation of the inclinometer.

13. The method of claim 12 further comprising a step for reversing the polarity of legs of the inclinometer after a fixed time for repeated measurements.

14. A method for minimizing net dc current through legs of an inclinometer during repeated measurements, comprising the steps of:
   (a) switching the legs of the inclinometer sequentially and individually across measurement circuitry and processing the output of the measurement circuitry; and (b) periodically reversing the polarity of the legs of the inclinometer across the measurement circuitry as the legs are switched into the measurement circuitry.

15. The method of claim 14 wherein the measurement circuitry is a Schmitt trigger circuit.

16. The method of claim 15 wherein the switching is accomplished by controlling at least one analog multiplexer integrated circuit.

* * * * *